May 19, 1942.　　　　J. C. McCUNE　　　　2,283,608
BRAKE CONTROL MEANS
Filed Feb. 28, 1941　　　3 Sheets-Sheet 2
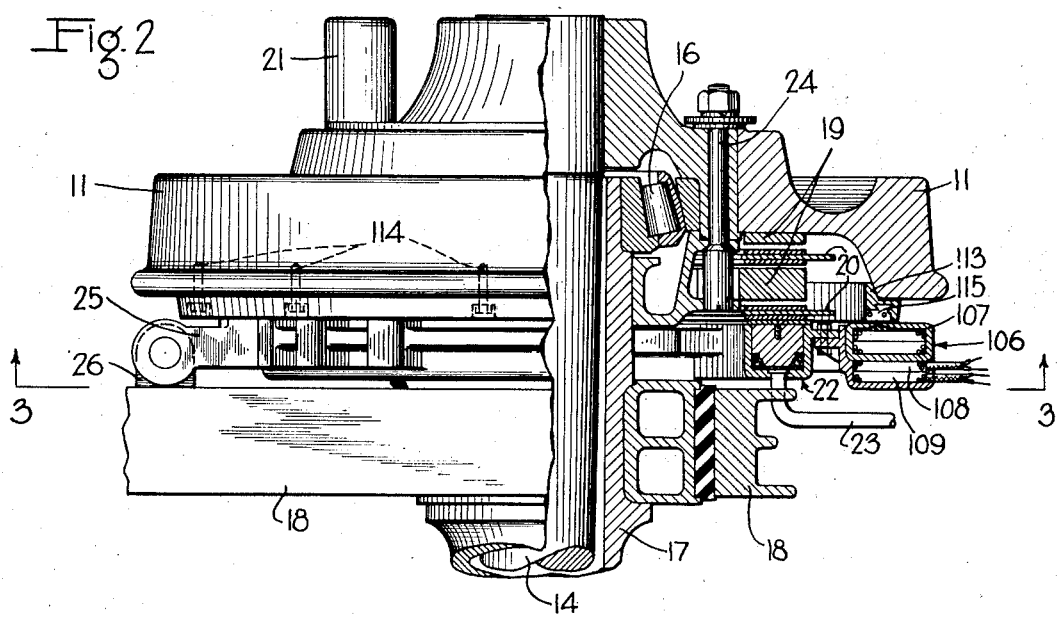
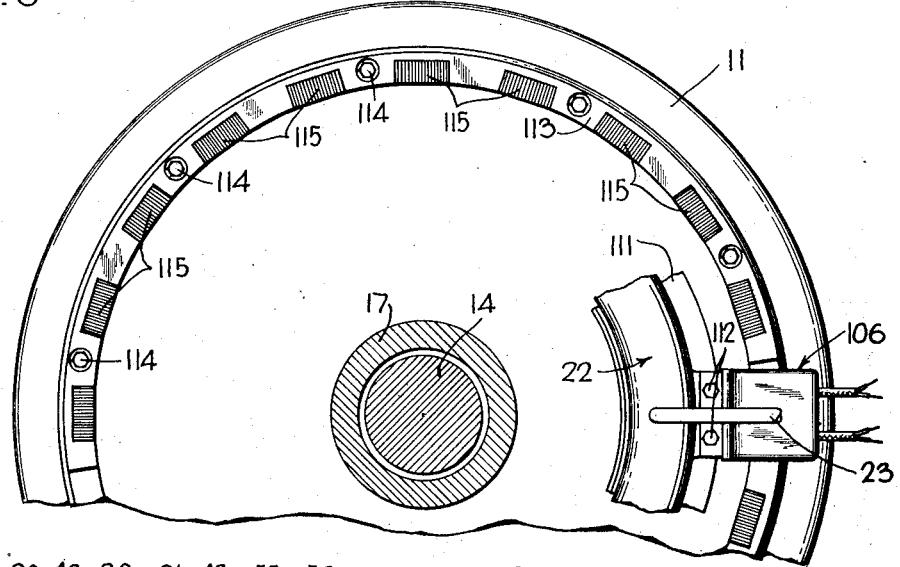
INVENTOR
JOSEPH C. McCUNE
BY
ATTORNEY May 19, 1942.   J. C. McCUNE   2,283,608
BRAKE CONTROL MEANS
Filed Feb. 28, 1941   3 Sheets-Sheet 3
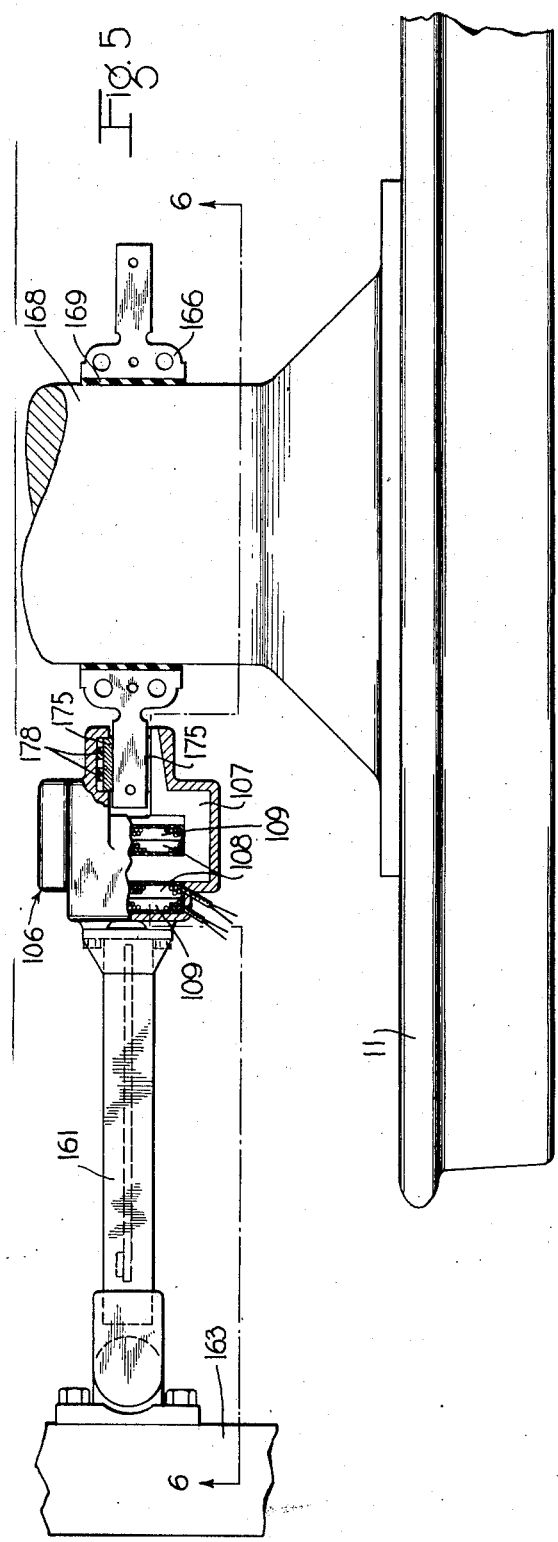
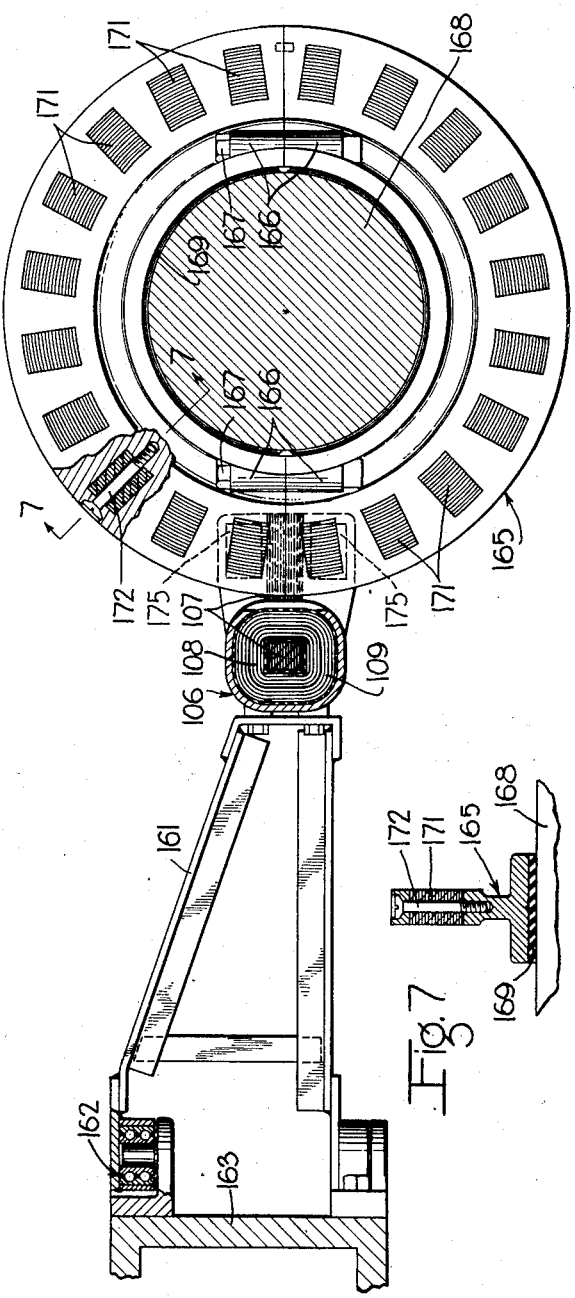
INVENTOR
JOSEPH C. McCUNE
BY
ATTORNEY Patented May 19, 1942

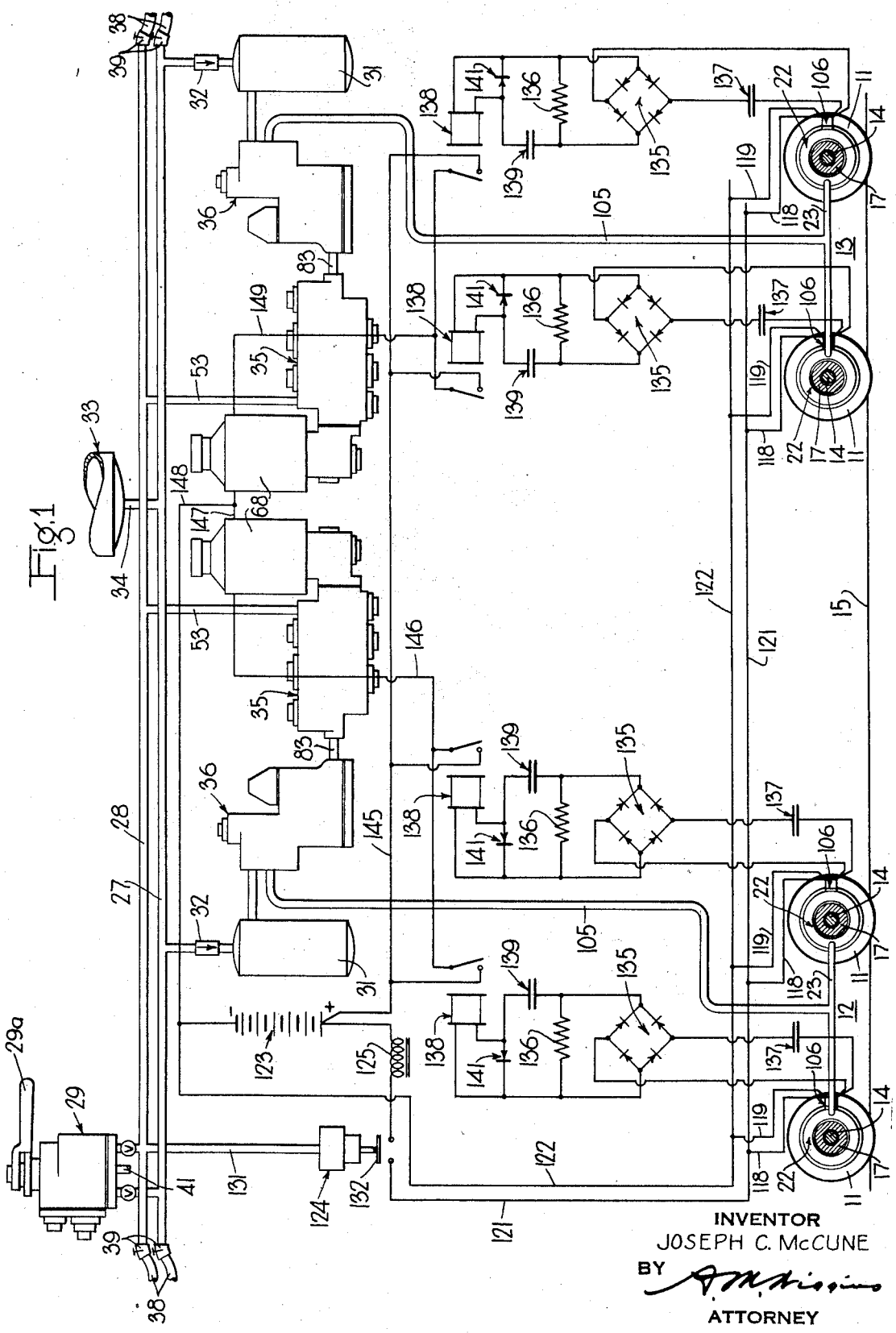

2,283,608

UNITED STATES PATENT OFFICE 2,283,608

BRAKE CONTROL MEANS

Joseph C. McCune, Edgewood, Pa., assignor to The Westinghouse Air Brake Company, Wilmerding, Pa., a corporation of Pennsylvania Application February 28, 1941, Serial No. 381,083

19 Claims. (Cl. 303—21)

This invention relates to brake control means and has particular relation to apparatus for controlling the brakes of vehicles, such as railway cars and trains, in a manner to prevent sliding of the vehicle wheels due to applications of the brakes.

As is well known, if the retarding force on a vehicle wheel exceeds the limit of adhesion between the wheel and the rail or road surface on which the wheel rolls, the wheel decelerates at an abnormally rapid rate to a locked condition and slides, thereby producing flat spots on the wheel as well as causing a reduction in the degree of braking effect on the vehicle, both of which effects are objectionable.

Various types of devices have accordingly been proposed which are responsive to the slipping condition of a vehicle wheel, that is the deceleration of the vehicle at an abnormally rapid rate, for the purpose of effecting an instantaneous and rapid reduction in the degree of application of the brakes associated with the vehicle wheel to cause the wheel to cease to decelerate and begin to accelerate back toward a speed corresponding to vehicle speed without actually decelerating to a locked condition and sliding.

The terms "slipping condition" and "sliding condition" of a vehicle wheel as employed herein are not synonymous. The term "slipping condition" refers solely to the rotation of the vehicle wheel at a speed less than a speed corresponding to vehicle speed whereas as the term "sliding condition" refers to the dragging of a vehicle wheel along a rail or road surface in a locked or non-rotative condition.

It is an object of my present invention to provide novel apparatus for detecting the slipping condition of a vehicle wheel.

It is another object of my invention to provide novel brake control apparatus for effecting the release and reapplication of the wheel brakes when a wheel slips.

It is another object of my invention to provide novel vehicle wheel brake control apparatus adapted to effect a continued rapid reduction in the degree of application of the brakes associated with a wheel only so long as the wheel decelerates at a rate exceeding a certain slipping rate and a gradual reapplication of the brakes beginning at the instant the slipping wheel ceases to decelerate at a rate exceeding the certain rate.

The above, and other objects of my invention will be made clear hereinafter and the novel features of my invention pointed out with particularity in the claims.

Briefly my invention comprises an induction generator having a non-rotative bi-polar magnetic member carrying a primary winding and a secondary winding; and a plurality of elements of magnetic material carried in circumferentially spaced relation on an element rotatable according to the rotation of a vehicle wheel for the purpose of bridging the air-gap between the two poles of the bi-polar member. Assuming energization of the primary winding with direct current, the rotation of the magnetic elements past the poles of the bi-polar element causes an alternating-current voltage to be induced in the secondary winding which varies in frequency and effective value in accordance with the speed of rotation of the vehicle wheel.

The alternating-current voltage delivered by the induction generator is rectified and impressed on a potentiometer or resistor. A relay and a condenser are connected in series relation across the potentiometer in a manner to cause a condenser charging and discharging current to flow through the winding of the relay which varies in proportion to the rate of change of direct-current voltage impressed on the potentiometer. The relay is operative in response to a current exceeding a certain value and corresponding to a certain rate of deceleration of the vehicle wheel which occurs only when the wheel slips.

Valve mechanism controlled by the relay is effective to cause reduction of the pressure in the brake cylinders only so long as the wheel deceleration exceeds a certain slipping rate and then to cause a gradual increase in the brake cylinder pressure to reapply the brakes.

My invention is shown in the accompanying drawings, wherein

Fig. 1 is a simplified diagrammatic view, showing a fluid pressure brake control equipment for the wheels of a single railway car and embodying my invention, Fig. 2 is an enlarged fragmental plan view of a vehicle wheel, partly in section, showing rotary or disk brakes associated with the wheels, as well as one specific arrangement of parts of the induction-generator associated with the wheel.

Fig. 3 is a view, taken on the line 3—3 of Fig. 2, showing further details of the induction-generator and the manner in which it is associated with the wheel.

Fig. 4 is an enlarged diagrammatic view, in vertical section, of the control valve shown in Fig. 1.

Fig. 5 is an enlarged plan view of a single car wheel, showing a modified arrangement for mounting the induction-generator in associated relation therewith.

Fig. 6 is a vertical sectional view, taken on the line 6—6 of Fig. 5, showing further details of construction.

Fig. 7 is a fragmentary sectional view, taken on the line 7—7 of Fig. 6.

*Description of equipment shown in Fig. 1*

Referring to Fig. 1, a simplified fluid pressure brake control apparatus for the wheels 11 of a single railway car is shown. The car is provided with two four-wheel trucks 12 and 13, hereinafter respectively referred to as the front and rear wheel trucks.

Each wheel truck comprises two wheel units, each unit being made up of an axle 14 and two wheels 11 fixed at opposite ends thereof for respectively engaging opposte rails of a track indicated by the line 15.

Although the wheel units may be mounted in any desired or conventional manner they are shown as rotatably mounted on tapered roller bearings 16 carried at opposite ends of the tubular support 17 which is non-rotatably carried by the two side frames 18 of the wheel truck, only one of which is shown.

Although the type of brakes associated with the wheels is immaterial for purposes of my present invention, a specific form of brake, referred to as the disk brake, is illustratively shown and will be briefly described.

The disk brake mechanism comprises alternately disposed rotative disks or rings 19 and non-rotative disks or rings 20 adapted to be normally maintained in axially spaced relation by a plurality of release spring devices 21, only one of which is visible in Fig. 2, and shiftable axially into cooperative frictional engagement by an annular brake cylinder device 22 to which fluid under pressure is supplied through a pipe 23.

One rotative disk or ring 19 is attached directly to the web of the vehicle wheel and the other is adapted to be slidably mounted for axial movement on a plurality of rods or bolts 24 extending through and secured to the web of the wheel, only one of which bolts is shown.

The non-rotative disks 20 are supported on arms, not shown, attached to the casing of the brake cylinder device 22 and the casing of the brake cylinder device 22 is provided with a torque arm 25 which engages a lug 26 attached to the side frame 18, thereby preventing rotation of the disks 20 and the casing of the brake cylinder device 22.

While any suitable or well-known type of brake control apparatus, either of the so-called automatic or straight-air type may be provided for supplying fluid pressure to the brake cylinder device 22 and releasing fluid under pressure therefrom for controlling the application and release of the wheel brakes, I have for convenience shown a simplified straight-air type of brake control apparatus. Such apparatus includes two train pipes 27 and 28, hereinafter referred to as the supply pipe and the control pipe respectively, a manually operative brake valve 29 of well-known self-lapping type for controlling the pressure in the control pipe 28, a plurality of local reservoirs 31 adapted to be charged to the pressure established in the supply pipe 27 through corresponding one-way or check valves 32, a main reservoir 33 constantly connected to the supply pipe 27 through a branch pipe 34 and adapted to be charged to a normal pressure, such as one hundred and ten pounds per square inch, by means of a fluid compressor not shown, a control valve device 35 for each wheel truck, and a relay valve device 36 for each wheel truck.

The train pipes 27 and 28 are made up of sections on each car which are connected between cars by hose couplings 38 and angle cocks 39 in conventional manner.

The brake valve 29 is of a well-known type and accordingly a functional description thereof is deemed sufficient for purposes of the present invention. The operating handle 29a of the brake valve is adapted to rotate a rotary operating shaft which in turn controls the operation of a supply and a release valve that respectively control the supply and the release of fluid under pressure to and from the control pipe 28. With the brake valve handle 29a in its normal or brake release position, fluid under pressure is entirely released from control pipe 28 to atmosphere through an exhaust port and pipe 41 at the brake valve. When the brake valve handle 29a is shifted in a horizontal plane out of its brake release position into a so-called application zone, fluid under pressure is supplied from the supply pipe 27 to the control pipe 28, the fluid pressure established in the control pipe varying substantially in proportion to the degree of displacement of the brake valve handle 29a out of its brake release position.

If the pressure in the pipe 28 tends to reduce for some reason, such as leakage, the brake valve 29 operates automatically to continue to supply fluid under pressure to the control pipe to maintain a pressure therein corresponding to the position of the brake valve handle. This pressure-maintaining feature of the brake valve 29 will be referred to hereinafter in connection with an assumed operation of the equipment.

Referring to Fig. 4, the control valve device 35 comprises a suitably sectionalized casing containing a cut-off valve device 43, a release valve device 44, a magnet valve device 45 for controlling the operation of the cut-off valve device 43 and the release valve device 44, and a so-called reapplication control valve device 46. While the parts of the valve device are shown in one plane, this is for convenience of description only. In actuality, the parts may be arranged in different planes for compactness.

The cut-off valve device 43 comprises a valve 48 of the poppet type and a fluid pressure operated valve piston 49. The valve 48 is contained in a chamber 51 which is connected by a passage including a choke-fitting 52 to a pipe 53 that is connected to the control pipe 28. A coil spring 54 is interposed between the valve 48 and a screw plug 55 closing the opening of the chamber 51 at the exterior of the casing for urging the valve 48 toward seated relation on an associated valve seat.

The valve 48 has a fluted stem which extends through a port in a wall 56 to a passage 57. When valve 48 is unseated the port is open and when the valve is seated the port is closed.

The valve piston 49 operates in a suitable bore and is urged upwardly into seated relation on an annular rib seat by a coil spring 59 interposed between the lower side of the valve piston and a screw plug 58 closing the opening of the bore at the exterior of the casing. When seated on the annular rib seat, the inner seated area of the valve is open to the passage 57. The valve piston 49 has a stem 61 which engages the end of the fluted stem of the valve 48. Valve 48 is normally unseated because the force of the spring 57 acting on the valve piston 49 is greater than that of the spring 54 acting on the valve 48.

The release valve 44 comprises a valve piston 62 that operates in a suitable bore and is biased upwardly into seated sealed relation on an annular rib seat by a coil spring 64 interposed between the lower side of the valve piston and a screw plug or cap 65 closing the opening of the bore at the exterior of the casing. The inner seated area of the valve piston 62 is open to atmosphere through an exhaust port 67 and the annular space surrounding the rib seat of the valve piston 68 is open to the passage 57.

The magnet valve device 45 comprises a suitable solenoid or electromagnet winding 68 effective when energized to exert a downward force on a plunger 69 to unseat a valve 71 of the poppet type against the force of a spring 72 normally urging the valve 71 to a seated position. When the valve 71 is unseated, it establishes communication between a passage 73 and an exhaust passage and port 74.

The passage 73 is in constant communication with the lower side of the valve pistons 49 and 62. The screw plugs 58 and 65 are provided on their threaded portions with annular grooves 70 which communicate with the interior recess 75 thereof through a port 76. The inner ends of the screw plugs 58 and 65 are provided with annular gaskets 77 on which the lower annular edge of the valve pistons 49 and 62 respectively seat when urged downwardly against the force of the springs 59 and 64.

It will thus be seen that notwithstanding the shifting of the valve pistons 49 and 62 downwardly to their lower seated positions, the lower side of the valve pistons 49 and 62 are constantly connected through the ports 76 and annular grooves 70 with passage 73.

The valve pistons 49 and 62 are provided with pressure equalizing ports 78 of restricted flow area which connect the lower side of the valve pistons to the passage 57.

As long as the valve 71 of the magnet valve device 45 is seated, the supply of fluid under pressure through pipe 53 past the valve 48 to the passage 57 is not effective to unseat the valve pistons 49 and 62 due to the fact that fluid under pressure flows through the ports 78 sufficiently rapidly that a differential fluid pressure force sufficient to overcome the springs 57 and 64 is not developed.

With fluid under pressure acting on the inner seated area of the valve piston 49 and the outer seated area of the valve piston 62 in passage 57, the energization of the solenoid 68 of the magnet valve device 45 and the consequent unseating of the valve 71 results in the sequential operation of the valve pistons 49 and 62 to their lower seated positions. It will be apparent that the unseating of the valve 71 causes fluid under pressure at the lower side of the valve pistons 49 and 62 to be rapidly vented to atmosphere through the exhaust port 74. Due to the restriction of the equalizing ports 78 in the valve pistons, a pressure differential occurs on the valve pistons which is effective to urge them downwardly to seated relation on the annular gasket seat 77. It will be observed that once the valve pistons are unseated downwardly, the area of the valve pistons subject to the higher pressure in the passage 57 is suddenly increased and consequently the valve pistons are snapped downward positively into seated relation on the annular gasket seat 77.

As long as sufficient pressure is maintained effective in the passage 57, the valve pistons 49 and 62 will remain in their seated position because of the maintenance of a pressure differential on the valve piston due to the ports 78 in the piston in the valve piston.

When the solenoid 68 is deenergized, the valve 71 is immediately reseated, thus preventing the exhaust of pressure from the lower side of the valve pistons 49 and 62. The volume of the passage 73 and the chambers at the lower side of the valve pistons 49 and 62 is so small that the pressure in the passage 57 and that at the lower side of the valve pistons 49 and 62 rapidly equalizes through the ports 78 and the valve pistons 49 and 62 are thus promptly restored to their upper seated positions by the springs 57 and 64 respectively.

The reapplication control valve device 46 comprises a poppet valve 81 contained in a chamber 82 that is constantly connected through a passage and pipe 83 to the associated relay valve device 36. Valve 81 is normally unseated by a spring 84 interposed between the end of the fluted stem of the valve and a screw plug 85. In its unseated position, the valve 81 opens a port between the passage 57 and the passage 83.

The valve 81 is operated to a seated position closing communication therepast between the passages 57 and 83 by a piston 86 that operates in a suitable bore in the casing and is biased upwardly by a coil spring 87 to a upper position in which a lug 88 formed on the piston engages the inner face of a screw plug 89 closing the opening of a chamber 90 above the piston to the exterior of the casing. Chamber 90 is connected by a passage 91 to the chamber 51 and the upper side of piston 86 is thus subject to the pressure of the fluid supplied from the pipe 53.

The valve 81 is provided on the side thereof opposite the fluted stem with a stem 93 having a small piston 94 formed at the end thereof which is slidably received in a suitable recess 95 in the piston 86. A sliding collar 80 is provided on the stem 93 and a coil spring 96 is interposed between the collar 80 and the valve 81. When the piston 86 is shifted downwardly, it shifts the valve 81 correspondingly downward into seated relation on an associated valve seat to close the port connecting passages 57 and 83. The piston 86 moves slightly more downwardly than the valve 81 thus slightly compressing the spring 96 to maintain the valve 81 firmly seated.

The lower side of the piston 86 is open to the chamber 82 and thus as long as the pressure of the fluid in the chamber 90 above the piston and in the chamber below the piston are substantially equal the valve 81 remains unseated. If the pressure in the chamber below the piston 86 is reduced sufficiently below the pressure maintained in the chamber 90 above the piston, the spring 87 is overcome. The piston 86 is thus shifted downwardly into seated relation on an annular gasket seat 97 and, at the same time, the valve 81 is firmly seated on its associated seat.

Communication is also provided between the passage 57 and the passage 83 through a branch passage 98 containing a choke-fitting 99 provided with a restricted port that is relatively small in flow area compared to the flow area of the choke-fitting 52, as shown.

Communication between the passage 57 and the passage 83 is also provided by a branch passage 101 containing a one-way valve 102, of the ball type. The arrangement of the ball valve 102 is such as to prevent the flow of fluid under pressure from the passage 57 to the passage 83 and to permit the back flow of fluid under pressure from the passage 83 to the passage 57 at a rapid rate. The purpose of valve 102 is to permit rapid flow of fluid under pressure from passage 83 to passage 57 when valve 81 is closed under circumstances hereinafter to be described.

Operation of the control valve device 35 will be further explained hereinafter in connection with an assumed operation of the equipment.

The relay valve device 36 for each wheel truck is of the type described and claimed in Patent 2,096,491 to E. E. Hewitt although any other suitable type of relay valve device may be employed. Since reference may be had to the patent for a detailed description of the relay valve device 36 it is here shown only in outline form and will be only briefly described.

The pipe 83 leading from the control valve device 35 opens into a pressure chamber at one side of an operating piston. Suitable supply and release valves are operated in response to the pressure supplied to the one side of the operating piston and automatically restored to a lap position in response to the pressure of fluid supplied by the supply valve. When the release valve is opened, fluid under pressure is released from the annular brake cylinders 22, associated with the wheels of the corresponding wheel truck, through a pipe 105 connecting the brake cylinder pipe 23 and the relay valve device 36.

Upon the supply of fluid under pressure to the pressure chamber at one side of the operating piston of the relay valve 36, the release valve and the supply valve are successively closed and opened. When the supply valve is opened, fluid under pressure is supplied from the local reservoir 31 and through the pipes 105 and 23 to the brake cylinder devices 22 to effect application of the brakes.

The pressure in the pipe 105 acts on the side of the operating piston opposite the pressure chamber and when the pressure established therein substantially balances the pressure supplied through pipe 83 to the pressure chamber, the supply valve is restored to its closed position while the release valve remains in its closed position. Thus the pressure of the fluid supplied to the brake cylinder devices 22 corresponds substantially to the pressure of the fluid supplied to the operating chamber at one side of the operating piston of the relay valve device 36.

Upon a reduction of the pressure of the fluid in the pressure chamber of the relay valve device 36, the release valve is opened and fluid under pressure is vented from the brake cylinder devices 22 to atmosphere through an exhaust port, not shown, until the pressure in the brake cylinders substantially balances that in the pressure chamber of the relay valve at which time the release valve is again closed.

The relay valve devices 36 are of exceedingly high capacity and are very sensitive to variations in pressure in the pressure chamber thereof so that the pressure in the brake cylinder devices 22 is varied substantially in accordance with the variation of the pressure in the pressure chamber.

Since the front and rear wheel trucks 12 and 13 are each provided with an individual control valve 35 and relay valve 36, it will be seen that the brakes on the individual wheel trucks may be separately controlled by the control valve device 35 corresponding thereto.

According to my invention, the equipment further comprises an induction-generator 106 associated with one of the wheels of each wheel unit. The induction-generator 106 comprises a bi-polar magnetic member 107 of substantially C-shape having thereon in concentric relation two windings 108 and 109, hereinafter referred to as the primary and secondary windings respectively. The bi-polar member 107 is contained in a suitable casing, preferably of non-magnetic material, secured to a flange 111 of the brake cylinder device 22 as by several screws or bolts 112.

The induction-generator 106 further comprises a ring member 113 of non-magnetic material, such as aluminum or brass, suitably secured to the wheel 11 on the inner face thereof radially inwardly from the flange on the wheel as by a plurality of screws 114. A plurality of laminated inserts 115 of magnetic material are secured in the ring 113 in substantially equally spaced relation circumferentially around the ring in a position closely adjacent to the air-gap between the poles of the bi-polar member 107 so that as the wheel 11 rotates, the inserts 115 provide a magnetic path between the poles of the bi-polar member.

The opposite terminals of the primary winding 108 are connected respectively by wires 118 and 119 to two bus wires 121 and 122 respectively, which bus wires are in turn connected to the opposite terminals of a suitable source of direct current, such as a storage battery 123. A pressure-operated switch 124 and a choke-coil 125 are interposed in one of the bus wires, as for example the bus wire 121, for a purpose hereinafter to be explained.

When energized, the primary winding 108 sets up a magnetic flux which traverses the magnetic member 107. The rotation of the magnetic inserts 115 past the poles of the member 107 causes the total reluctance of the magnetic path to be alternately increased and decreased. This causes a corresponding alternate increase and decrease of the density of the magnetic flux in the member 107 whereby an alternating-current voltage is induced in the secondary winding 109. The voltage so induced in winding 109 has a frequency and an effective value substantially proportional to the speed of rotation of the vehicle wheel 11.

The pressure switch 124 may be of any suitable type, such as that shown in Patent 2,096,492 to E. E. Hewitt. The switch 124 has an operating chamber which is connected by a branch pipe 131 to the control pipe 28. When the pressure in the control pipe 28 is below a certain pressure such as five pounds per square inch, the contact 132 of the switch is biased to its open position interrupting the connection of the bus wire 121 to the corresponding terminal of the battery 123. When the pressure in the control pipe 28 increases above five pounds per square inch, the contact 132 is snapped into contact with a pair of associated stationary contacts, in which closed position it establishes the connection between the bus wire 121 and the corresponding battery terminal. It will thus be seen that the primary windings 108 of the induction generators 106 associated with the wheels 11 are not energized unless a pressure exceeding five pounds per square inch exists in the control pipe. In other words when the brakes are released, the primary windings 108 are deenergized to prevent the unnecessary consumption of current from the battery 123.

The choke-coil 125 is provided to eliminate the effect of the self-induced voltage in the primary winding 108 due to the alternate increase and decrease in the density of the magnetic flux in the member 107 when the primary winding 108 is energized. It will be apparent that the self-induced alternating-current voltage in the primary winding 108 may cause fluctuation in the terminal voltage of the battery 123 which is undesirable. The choke-coil 125, or any other equivalent device for the same purpose, is accordingly provided to prevent undesirable fluctuations in the terminal voltage of battery 123.

Although I have shown the primary windings 108 connected in parallel relation across the bus wires 121 and 122, it will be seen that the primary windings may be connected in series relation if desired, in which case the primary windings act as choke-coils for one another.

In accordance with my invention, I further provide a full-wave rectifier 135 of any suitable type, illustratively shown as of the dry-disk or copper-oxide type, for converting the alternating-current voltage output from the secondary winding 109 of each of the induction-generators 106 to direct-current voltage, which direct-current voltage is impressed on a potentiometer or resistor 136.

In order to maintain a close phase-relationship of the current and voltage and accordingly as nearly a unity power-factor as possible in the circuit of the secondary winding 109 of each induction-generator, I provide a condenser 137 in one of the connections to the rectifier 135.

It is desirable that the power-factor in the secondary winding circuit of each induction-generator be as nearly unity as possible in order to obtain the maximum power output from the rectifier.

There are also provided, in accordance with my invention, a relay 138 and a condenser 139, connected in series relation across the terminals of each potentiometer 136.

The relay 138 is adapted to be operatively responsive only to a current in one direction through the winding thereof and in excess of a certain value. For this purpose a rectifier 141 or other similar asymmetric device is provided in parallel relation with the winding of the relay so as to provide an effective shunt for the winding only if the current flows in the direction permitted by the rectifier. If a relay of the unidirectional type is employed in place of relay 138, the rectifier 141 may be dispensed with.

The connections of the winding of the relay 138 and condenser 139 are such that upon an increase of the voltage across potentiometer 136, due to increasing wheel speed, the charging current for the condenser 139 flows through the rectifier 141 in by-passing relation to the winding of the relay 138 so that the single front contact of the relay is not picked-up but remains in its dropped-out or open position.

When the voltage across potentiometer 136 reduces, due to reducing wheel speed, current is discharged locally from the condenser 139 through the potentiometer 136 and the winding of the relay 138 because the direction of flow of current is such that no flow occurs through the rectifier 141.

The design of the relay 138 and of the condenser 139 is such that unless the wheels 11 on the wheel unit corresponding thereto decelerate at a rate in excess of a certain rate, such as ten miles per hour per second, which occurs only when the wheels are in a slipping condition, the condenser discharge current energizing the winding of the relay 138 is insufficient to cause pick-up of the single front contact of the relay. When the wheel slips, however, the current discharged from the condenser 139 through the winding of the relay 138 exceeds the value sufficient to pick-up the relay and the contact of the relay is actuated to its picked-up or closed position and remains picked-up only so long as the rate of deceleration of the vehicle wheel corresponding thereto exceeds the certain rate assumed to be ten miles per hour per second.

The two relays 138 for the two wheel units of the front wheel truck 12 have their contacts connected in parallel relation in a circuit for energizing the solenoid or magnet winding 68 of the corresponding control valve device 35. This circuit extends from the positive terminal of the battery 123 by way of a bus wire 145 through the parallel-connected contacts of the two relays 138 for the front wheel truck to a wire 146, solenoid 68 of the corresponding control valve device 35, and wires 147 and 148 back to the negative terminal of the battery 123. It will thus be seen that operation of either of the two relays 138 for the front wheel truck 12 to its picked-up position is effective to cause energization of the solenoid winding 68 of the corresponding control valve device 35.

The contacts of the two relays 138 for the rear wheel truck 13 are likewise connected in parallel relation and serve to control the energization and deenergization of the solenoid winding 68 for the control valve device 35 corresponding to the rear wheel truck. This circuit extends from the positive battery bus wire 145 through the parallel-connected contacts of the relays 138 to a wire 149, solenoid winding 68 of the corresponding control valve device 35, and wires 147 and 148 back to the negative terminal of the battery 123.

*Operation of equipment shown in Fig. 1*

Let it be assumed that the main reservoir 33 in Fig. 1 is charged to the normal pressure carried therein and that supply pipe 27 and the local reservoirs 31 for each wheel truck are correspondingly charged. Let it be further assumed that the car is traveling along the road under power and that the brake valve handle 29a is in its brake release position so that the pressure of the fluid in the control pipe 28 is atmospheric pressure and the brakes are correspondingly released.

If, now, the operator desires to bring the car to a stop, he first shuts off the propulsion power and then shifts the brake valve handle 29a into its application zone an amount corresponding to the desired degree of brake application. The control pipe 28 is thus charged to a pressure corresponding to the position of the brake valve handle 29a, for example, fifty pounds per square inch.

With the solenoid winding 68 of each of the control valve devices 35 deenergized as they now are, for reasons hereinafter made apparent, communication is established from the control pipe 28 through each of the control valve devices 35 and pipe 83 to the corresponding relay valve 36 for each wheel truck. By reference to Fig. 4, it will be seen that fluid under pressure flows from the control pipe 28 through the pipe 53, choke 52, chamber 51, past the unseated valve 48, passage 57, past the unseated valve 81, and passage and pipe 83 to the pressure chamber of the relay valve 36.

Each relay valve 36 is accordingly operated in response to the control fluid pressure acting in the pressure chamber thereof, to supply fluid under pressure from the local reservoir 31 associated therewith to the brake cylinders 22 of the wheel units of the corresponding wheel trucks, the fluid pressure established in the brake cylinders corresponding to that established in the control pipe 28. It should here be noted that although it is assumed that the pressure established in the brake cylinders corresponds to that established in the control pipe 28, the relay valve devices 36 may be so constructed and designed as to cause any desired ratio of pressures to be established between the pressure in the control pipe and that in the brake cylinders.

Upon the supply of fluid under pressure to the brake cylinder devices 22 associated with the car wheels 11, the rotative and non-rotative disks 19 and 20 are shifted into frictional engagement, and a retarding force is thus exerted on the wheel units in proportion to the pressure of fluid supplied to the brake cylinders 22.

If the degree of brake application and the adhesion of the wheels to the rails is such that during a brake application none of the wheels on the car slip, no variation of the pressure of the fluid supplied to the brake cylinders 22 occurs except in accordance with the variations of the pressure in the control pipe 28 as effected by the operator through operation of the brake valve 29.

When the car comes to a stop, the operator may release the brakes prior to again starting the car by merely restoring the brake valve handle 29a to its brake release position, thereby reducing the pressure in the control pipe 28 and correspondingly in the pressure chamber of the relay valve devices 36 to atmospheric pressure. The relay valve devices 36 operate in response to the reduction of the pressure in the pressure chambers thereof to atmospheric pressure to cause venting of fluid under pressure from the brake cylinders 22 to atmosphere at the relay valve devices 36.

Let it now be assumed that while the brakes are applied, the trailing or right-hand wheel unit of the rear wheel truck 13 begins to slip. In such case, the relay 138 corresponding thereto is picked-up and establishes the circuit, previously traced, for energizing the solenoid winding 68 of the control valve device 35 of the rear wheel truck 13.

Upon energization of the solenoid winding 68, valve 71 (Fig. 4) is unseated and consequently the chambers beneath the valve pistons 49 and 62 are vented rapidly to atmosphere through the exhaust port 74, thereby causing the seating of the poppet valve 48 and the unseating of the valve piston 62 in rapid succession. Valve 48 is effective, when seated, to close the communication previously described through which fluid under pressure is supplied to the pressure chamber of the relay valve 36. The valve piston 62, when unseated, is effective to establish communication between the passage 57 and the exhaust port and passage 67 so that the fluid under pressure is rapidly vented to atmosphere from the pressure chamber of the relay valve device 36.

Upon a sufficient reduction of the pressure in the passage 57, for example five pounds per square inch, with respect to the pressure in the passage 91 and chamber 90 above the piston 86 of the reapplication control valve 46, valve 81 is shifted downwardly into seated position and maintained seated thereafter as long as such differential pressure exists on the piston 86, for a purpose which will be presently explained. When valve 81 seats, fluid under pressure continues thereafter to be rapidly vented from the pressure chamber of the relay valve device 36 past the ball check valve 102 to passage 57.

The instantaneous and rapid reduction of the pressure in the pressure chamber of the relay valve 36 occasioned by the unseating of the valve piston 62 causes an instantaneous and rapid reduction of the pressure in the brake cylinders 22 of the rear wheel truck 13 so that the degree of the application of the brakes on the rear wheel truck is correspondingly reduced at a rapid rate.

Due to the instantaneous and rapid reduction of the pressure of the fluid in the brake cylinders 22, the degree of retarding effect on the wheels of the rear wheel truck 13 is correspondingly rapidly diminished to a point such that the slipping wheels cease to decelerate and begin to accelerate back toward a speed corresponding to vehicle speed without actually decelerating to a locked condition and sliding. The character of the disk type of brake is such as to offer a substantially instantaneous response to a small percentage reduction of the total pressure of fluid supplied to the brake cylinders 22. Thus, for example with a pressure of fifty pounds per square inch acting in the brake cylinders 22, a reduction of fifteen pounds per square inch pressure may be sufficient to cause the slipping wheels to return back toward a speed corresponding to car speed.

Whenever the rate of deceleration of the slipping wheel units decreases below the slipping rate of ten miles per hour per second, the relay 138 drops-out thus instantly deenergizing the solenoid winding 68 of the corresponding control valve device 35. The valve 71 is instantly reseated in response to the deenergization of the solenoid winding 68, and the valve pistons 62 and 49 are thus successively and promptly restored to their upper positions to cut-off the exhaust of fluid under pressure through the exhaust port 67 and restore communication past the valve 48 from pipe 53 to the passage 57.

Due to the existing differential of pressure acting on the piston 86 of the reapplication control valve device 46, the valve 81 remains seated and thus, upon the reestablishment of the supply communication from the control pipe 28 to the pressure chamber of the relay valve device 36 by unseating of the valve 48, fluid under pressure cannot flow to the pressure chamber of the relay valve 36 except at a restricted rate determined by the choke-fitting 99. Due to the relatively slow restoration of pressure in the pressure chamber of the relay valve 36, the pressure in the brake cylinders 22 on the rear wheel truck 13 is restored at a correspondingly slow rate. The restoration at a slow rate of the pressure in the brake cylinders 22 of a wheel truck on which the wheels have slipped minimizes the possibility of the recurrence of slipping by preventing the rapid restoration of the original pressure in the brake cylinders which initially caused slipping of the wheels.

When the pressure of fluid supplied to the pressure chambers of the relay valve device is built-up sufficiently beneath piston 86 of the reapplication control valve device 46 with respect to that in the chamber 90 above the piston, spring 87 shifts the piston 86 upwardly to unseat valve 81. Thereafter fluid under pressure is resupplied to the pressure chamber at a rapid rate until the full control pipe pressure is established therein.

If the adhesion between the wheels and the rails remains uniformly bad, various wheel units may slip repeatedly. In such case, however, the operation above-described is repeated so that at no time are the slipping wheels permitted to decelerate to a locked condition and slide.

It will be observed however, that repeated slipping cycles do not result in an undue consumption of fluid pressure because a relatively low percentage reduction of pressure in the brake cylinders is sufficient to cause the return of slipping wheels back toward a speed corresponding to vehicle speed. Thus, although several cycles of operation may occur during a stop, the actual amount of fluid under pressure wasted is tolerable.

If one or both of the wheel units of the front wheel truck 12 should happen to slip during a brake application, the corresponding one or both of the relays 138 corresponding to the front wheel truck 12 will be picked-up and the solenoid winding 68 for the control valve 35 corresponding to the front wheel truck energized. The operation of the control valve 35 and relay valve 36 for the front wheel truck is exactly the same as previously described for the rear wheel truck and is accordingly not repeated. It should be noted however, that slipping of a wheel unit results in the reduction of the pressure in the brake cylinders associated only with the wheels of the truck having the slipping wheel unit and does not affect the wheels of any other wheel trucks.

It should be observed that the direction of rotation of the wheels is immaterial insofar as the operation of the relays 138 is concerned. Accordingly, the equipment functions automatically for either direction of travel of the car to guard against sliding of the wheels.

In view of the fact that fluid under pressure is always restored in the brake cylinders 22 associated with the wheels 11 whenever the wheels cease to slip, it will be apparent that when the car comes to a stop, the brakes remain applied to a degree determined accordingly to the displacement of the brake valve handle 29a out of its brake release position.

As previously described, when it is desired to again proceed with the car, the operator merely restores the brake valve handle to its brake release position to effect release of the brakes.

*Modification shown in Figs. 5, 6 and 7*

Referring to Figs. 5, 6 and 7, a different type of construction is shown for the induction-generator 106 of Fig. 1. In Fig. 5, the casing containing the magnetic core member 107 and the primary and secondary windings 108 and 109 is supported on a bracket arm 161 which is hingedly mounted on suitable bearings 162 carried by a truck bolster or transom 163. Associated with the core member 107 is a split ring member 165 provided with suitable flanges 166 having bolt holes through which securing bolts 167 extend for securing the ring member 165 to the rotating axle 168 connecting a pair of car wheels in conventional and well-known manner. A split-bushing 169 of resilient material, such as rubber, may be provided between the split ring 165 and the surface of the axle 168 for the purpose of absorbing shock and vibration incident to travel of the vehicle along the track rails.

As seen particularly in Figs. 6 and 7, the radially extending portion or flange of the ring member 165 has a plurality of substantially rectangular openings therethrough for receiving laminated inserts 171 of magnetic material, which inserts are held in place by radially extending screws 172 inserted from the outer periphery of the ring member and extending radially through the insert. The opposite faces of the inserts 171 are preferably flush with the corresponding faces of the flange of the ring 165.

The radially extending flange of the ring member 165 extends between the pole pieces of the core member 107 and the magnetic inserts 171 thus pass directly between the opposite pole pieces of the core member in succession to alternately increase and decrease the magnetic flux density in the core member 107.

In order to provide a uniform voltage wave characteristic, it is desirable to prevent, as much as possible, the irregular variation of the air-gap between the magnetic inserts 171 and the pole pieces of the core member 107. I, therefore, provide in the casing above and below each pole-piece of the core member 107, a brush device 175 made of a suitable self-lubricating metal, such as a composition of brass and graphite. The brush devices 175 engage the opposite smooth-faced sides of the radial flange of the ring 165, thereby maintaining the radial flange of the ring member 165 in a substantially centered position between the pole-pieces of the core member 107.

It is well-known that in the operation of a railway car, a wheel-and-axle unit has a certain amount of end play, that is the wheel unit shifts a slight amount transversely of the car. It is necessary, therefore, that the casing containing the core member 107 be permitted to move in correspondence with the shifting of the axle 168. For this reason I have provided the hinged bracket 161 to enable the casing and core member 107 to shift laterally in either direction with the wheel unit.

If the bracket 161 is made sufficiently long, there should be no binding of the flange of the ring 165 between the brush devices 175 on opposite sides thereof. If a short bracket arm 161 is employed however, such binding may occur upon end play of the axle 168. To avoid such binding, therefore, the brush devices 175 may have bonded thereto a plurality of disks or buttons 178 of resilient material, such as cork or rubber, which permit slight angular movement of the brush devices 175 in the receiving recess therefor in the casing.

The primary and secondary windings 108 and 109 of the induction-generator 106 shown in Fig. 5 may be connected into the circuit of Fig. 1 in the same manner as the corresponding windings shown in Fig. 2. The operation of the induction-generator of Fig. 5 is therefore the same as that of Fig. 2 in principle and, accordingly, no further description of this type of generator is believed necessary.

The arrangement shown in Fig. 5 is more conveniently employed in connection with the more conventional type of wheel unit having the opposite wheels connected by a rotating axle. Moreover, due to the special provision for maintaining the air-gap between the flange of the rotating ring 165 and the pole-pieces of the core member 107 substantially uniform regardless of end-play of the wheel unit or shocks and jars, the alternating-current voltage characteristic provided by the arrangement shown in Fig. 5 may be more satisfactory than that of the induction-generator shown in Fig. 2.

Summary

Summarizing, it will be seen that I have disclosed a brake control system for vehicles, such as railway cars and trains, wherein a novel arrangement is provided, including an induction-generator associated with individual wheel units, for effecting a rapid reduction in the degree of application of the brakes associated with the wheel units, whenever the wheels of the unit begin to slip, for the purpose of preventing sliding thereof.

It will also be seen that I have disclosed various novel arrangements for mounting an induction-generator in associative relation with a wheel unit, particularly wheel units having endplay, for the purpose of providing a more uniform alternating-current voltage characteristic for any given constant speed of rotation of the wheel unit.

While I have shown and described only several specific embodiments of my invention, it will be apparent that various omissions, additions, or modifications may be made without departing from the spirit of my invention. It is accordingly not my intention to limit the scope of my invention except in accordance with the terms of the appended claims.

Having now described my invention, what I claim as new and desire to secure by Letters Patent, is:

1. Control apparatus for the brakes associated with the wheels of a vehicle of the type in which the brakes are applied and released under the control of the operator, comprising an induction-generator for supplying an alternating-current voltage having an effective value substantially proportional to the rotational speed of a wheel of the vehicle, a rectifier for converting the alternating-current voltage to a direct-current voltage, a resistor on which the direct-current voltage is impressed, and means controlled according to the rate of change of voltage impressed on said resistor for controlling the degree of application of the brakes associated with said wheel.

2. Control apparatus for the brakes associated with the wheels of a vehicle of the type in which the brakes are applied and released under the control of the operator, comprising an induction-generator for supplying an alternating-current voltage having an effective value substantially proportional to the rotational speed of a wheel of the vehicle, a rectifier for converting the alternating-current voltage to a direct-current voltage, a resistor on which the direct-current voltage is impressed, and means responsive to a change in the voltage impressed on said resistor at a rate exceeding only a certain rate for controlling the degree of application of the brakes associated with said wheel.

3. Control apparatus for the brakes associated with the wheels of a vehicle of the type in which the brakes are applied and released under the control of the operator, comprising an induction-generator for supplying an alternating-current voltage having an effective value substantially proportional to the rotational speed of a wheel of the vehicle, a rectifier for converting the alternating-current voltage to a direct-current voltage, a resistor on which the direct-current voltage is impressed, and means effective only so long as the voltage impressed on said resistor reduces at a rate exceeding a certain rate for effecting a continuing reduction in the degree of application of the brakes associated with said wheel.

4. Control apparatus for the brakes associated with the wheels of a vehicle of the type in which the brakes are applied and released under the control of the operator, comprising an induction-generator for supplying an alternating-current voltage having an effective value substantially proportional to the rotational speed of a wheel of the vehicle, a rectifier for converting the alternating-current voltage to a direct-current voltage, a resistor on which the direct-current voltage is impressed, a condenser, a relay having an operating winding, the operating winding of said relay and said condenser being connected in series relation across said resistor whereby upon an increase in the voltage across said resistor the current flows in one direction through the winding of said relay to charge said condenser which current is proportional to the rate of increase of voltage across the resistor, and whereby upon a reduction of the voltage across said resistor a current flows through the winding of said relay to discharge said condenser, which current is substantially proportional to the rate of reduction of the voltage across said resistor, said relay being operatively responsive only to a condenser discharge current exceeding a certain value and corresponding to deceleration of the vehicle wheel at a rate in excess of a certain rate, and means controlled by said relay for effecting a continuing reduction in the degree of application of the brakes associated with said wheel only so long as said relay is operatively responsive to the reduction of voltage on said resistor.

5. Control valve mechanism comprising a casing having a first communication, a second communication, a third communication, a first valve device normally in a position to connect said first and said second communications and operative to a different position closing the connection between the first and second communications, a second valve device normally in a closed position and operative to a different position to establish an exhaust connection to atmosphere from said second communication, means for effecting substantially simultaneous operation of said valve devices to the different positions thereof and restoring them to their normal positions substantially simultaneously, three parallel-related passages connecting said second and said third communications, a valve controlling communication through one of said passages, pressure responsive means effective as long as the differential of fluid pressure in said first and said third communications exceeds a certain value for operating said valve to close said first passage, means in a second of said passages for restricting the rate of flow of fluid under pressure between said second and said third communication to a relatively slow rate, and a one-way valve in the third of said passages for preventing the flow of fluid under pressure from said second to said third communication and to permit reverse flow of fluid under pressure therepast at a relatively rapid rate.

6. In combination, a pipe adapted to be charged with fluid at different pressures, a device having a chamber for receiving fluid under pressure from said pipe, and a valve mechanism for controlling the supply of fluid under pressure from said pipe to said device and the release of fluid under pressure from said device, said valve mechanism comprising a casing having a first communication connected to said pipe, a second communication, and a third communication connected to the chamber of said device, a valve device normally in an open position permitting the flow of fluid under pressure from the first communication to the second communication and operative to a different position to prevent such flow, a second valve device normally in a closed position and operative to a different position to vent fluid under pressure from said second communication to atmosphere, means for effecting substantially simultaneous operation of said first and said second valve devices to their different positions and restoration thereof to their normal positions, three parallel-related passages connecting said second and said third communications, a normally open valve controlling the flow of fluid under pressure through one of said passages from said second to said third communication, fluid pressure responsive means subject on one side to the pressure in said first communication and on the opposite side to the pressure of fluid in said third communication and effective to operate said valve to its closed position as long as the differential of the pressures in the first and third communications exceeds a certain value, means in a second of said passages for preventing the flow of fluid under pressure between the second and said third communication except at a relatively restricted rate, and a one-way valve in the third of said passages for preventing flow of fluid under pressure except from said third communication to said second communication.

7. Control apparatus for the brakes associated with the wheels of a vehicle comprising, in combination, a pipe adapted to be charged with fluid at different pressures under the control of the operator of the vehicle for controlling the release and the application of the brakes, a device having a chamber and effective in accordance with the pressure of the fluid in said chamber to control the release and application of the brakes, and a valve mechanism for controlling communication between said pipe and said chamber of said device, said valve mechanism comprising a casing having a first communication chargeable with fluid at a pressure corresponding to the pressure of said pipe, a second communication, a third communication connected to the chamber of said device, a cut-off valve device normally permitting the flow of fluid under pressure from said first communication to said second communication and operative to a closed position to prevent such flow, a release valve device normally in a closed position preventing the exhaust of fluid under pressure from said second communication and operative to a different position to effect the exhaust of fluid under pressure from said second communication, means for effecting substantially simultaneous operation of said cut-off and said release valve devices to the closed and open positions thereof respectively and substantially simultaneous restoration thereof to the normal positions thereof, three parallel-related passages connecting said second and said third communications, a valve controlling the flow of fluid under pressure between said second communication and said third communication through one of said passages, fluid pressure responsive means effective whenever the differential of the fluid pressure in the first communication over that in said third communication exceeds a certain value for maintaining said valve closed, means in a second of said passages for restricting the rate of flow of fluid between said second and said third communication to a relatively slow rate, and a one-way valve in the third of said passages for preventing the flow of fluid from said second to said third communication and for permitting reverse flow of fluid under pressure therepast at a relatively rapid rate.

8. Vehicle wheel brake control means for preventing the sliding of a vehicle wheel due to application of the brakes, said means comprising valve means normally effective to establish a communication through which fluid under pressure is supplied to effect application of the brakes and operative to close said communication and establish a second communication through which fluid under pressure is released to effect a reduction in the degree of application of the brakes, means responsive to the rate of deceleration of the vehicle wheel and effective as long as the wheel decelerates at a rate exceeding a certain rate to effect operation of the valve means and promptly effective when the wheel ceases to decelerate at a rate exceeding said certain rate for effecting restoration of the valve means to its normal condition reestablishing communication through which fluid under pressure is supplied to effect reapplication of the brakes, and means effective upon the establishment of said second communication for preventing the resupply of fluid under pressure through the first said communication except at a relatively slow rate.

9. Vehicle wheel brake control means for preventing the sliding of the vehicle wheels, comprising a pipe chargeable to different pressures to select the degree of application of the brakes associated with a vehicle wheel in proportion to the pressure established in said pipe, fluid pressure operated means for effecting application of the brakes associated with a vehicle wheel in accordance with the pressure of the fluid supplied thereto, valve mechanism normally conditioned to establish a communication through which fluid under pressure is supplied from said pipe to said fluid pressure operated means and operative to close said communication and effect the release of fluid under pressure from said fluid pressure operated means, means responsive to the rate of deceleration of a vehicle wheel effective to cause said valve mechanism to be operated to release fluid under pressure from the fluid pressure operated means only so long as the wheel decelerates at a rate exceeding a certain rate, and means controlled according to the relation of the pressure in said pipe and in said fluid pressure operated means for preventing the supply of fluid under pressure from said pipe to said fluid pressure operated means except at a relatively restricted rate as long as a predetermined differential exists between the pressure in said pipe and that in said fluid pressure operated means.

10. Control means for the brakes associated with a vehicle wheel comprising a non-rotative magnetic member carried on the vehicle, said member having two pole-pieces of opposite polarity separated by an air-gap and a winding inductively associated therewith, a plurality of magnetic elements carried by a wheel of the vehicle in a position such that upon rotation of the vehicle wheel the magnetic elements successively bridge the air-gap between the pole-pieces of the magnetic member to alternately increase and decrease the reluctance between the pole-pieces, said winding having an alternating-current voltage induced therein having a frequency and an effective value corresponding to the speed of rotation of the vehicle wheel, means responsive to a change in the effective voltage induced in the winding at a rate exceeding a certain rate, and means controlled by the last said means for controlling the degree of the application of the brakes associated with said wheels.

11. Apparatus for controlling the brakes associated with a vehicle wheel comprising a magnetic member having two pole-pieces of opposite polarity separated by an air-gap and carried non-rotatively on the vehicle adjacent the vehicle wheel, a first winding adapted to be energized by a direct-current for setting up a magnetic flux in said magnetic member, a second winding inductively related to the first winding and having an alternating-current voltage induced therein in response to variations in the density of the magnetic flux in said magnetic member, means for producing alternate increases and decreases in the density of the flux in said magnetic member comprising a ring of non-magnetic material secured to the vehicle wheel and having a plurality of magnetic elements secured thereto to move past the pole-pieces of the said magnetic member whereby to alternately increase and decrease the density of the magnetic flux in said magnetic member, and means controlled according to the rate of change of the voltage induced in said second winding for controlling the degree of application of the brakes associated with said wheel.

12. Apparatus for controlling the brakes associated with a railway car wheel unit of the type having a pair of wheels fixed at opposite ends of a rotating axle, comprising an annular member secured to the axle between the wheels and having a radially extending portion of non-magnetic material and a plurality of elements of magnetic material in peripherally spaced relation therein, a magnetic member having two pole-pieces of opposite polarity separated by an air-gap and a winding associated therewith in such a manner as to have an alternating-current voltage induced therein upon successive variations in the density of the magnetic flux in said magnetic member, means for mounting said magnetic member on the frame of the wheel truck associated with the vehicle wheel so that the flange of the annular member secured to the axle passes between the pole-pieces of the magnetic member and adapted to permit movement of said magnetic member in accordance with the end-play of the said wheel unit, and means controlled according to the rate of change of voltage induced in the said winding for controlling the degree of application of the brakes associated with the said wheel unit.

13. Apparatus for producing an alternating-current voltage having an effective value and frequency corresponding to the speed of rotation of a railway car wheel unit of the type having a pair of wheels fixed to the opposite ends of a rotating axle and subject to end-play, comprising an annular member adapted to be secured to the axle at a point between the wheels and having a radially extending flange of non-magnetic material and a plurality of magnetic elements in peripherally spaced relation in said flange, a magnetic member having two pole-pieces of opposite polarity separated by an air-gap, a winding inductively associated with said magnetic member so as to have an alternating-current voltage induced therein upon successive variations of the density of the magnetic flux in said magnetic member, and means movably mounting said magnetic member on the frame of the wheel truck in a manner to permit a flange of the annular member to pass between the pole-pieces of the magnetic member so that the magnetic elements in the flange are effective to alternately increase and decrease the density of the magnetic flux in the magnetic member upon rotation of the axle, said mounting means at the same time permitting movement of said magnetic member in accordance with the end-play of the wheel unit to prevent undesired variation in the reluctance of the air-gap between the pole-pieces of the magnetic member and the flange of the annular member.

14. Apparatus for supplying an alternating-current voltage having an effective value and frequency proportional to the rotational speed of a railway car wheel and axle assembly, comprising an annular member secured to said axle at a point between said wheels, said annular member having a radially extending flange of non-magnetic material in which are a plurality of peripherally-spaced perforations, magnetic elements secured within the perforations in the flange of said annular member, a magnetic member having two pole-pieces of opposite polarity separated by an air-gap, a winding associated with said magnetic member in a manner to have an alternating-current voltage induced therein upon successive variations of the density of the magnetic flux in said magnetic member, a casing supporting said magnetic member and winding, means movably supporting the casing on the frame of the wheel truck in a manner that the flange of the annular member passes between the pole-pieces of the magnetic member and adapted to permit movement of the casing in accordance with the end-play of the wheel and axle assembly, and means carried by the casing for contacting opposite faces of the flange of said annular member for maintaining the flange of the annular member in substantially uniform spaced relation to the pole-pieces of the magnetic member.

15. Apparatus for supplying an alternating-current voltage having an effective value and frequency proportional to the rotational speed of a wheel and axle assembly of a railway car, comprising a non-magnetic member rotatable with the assembly and having in peripherally spaced relation thereon a plurality of magnetic elements, a magnetic member having two pole-pieces of opposite polarity separated by an air-gap, a first winding adapted to be energized by a direct-current for inducing a magnetic flux in said magnetic member, a second winding associated with the magnetic member in a manner to have an alternating-current voltage induced therein upon successive variations in the density of the magnetic flux in the magnetic member, a casing containing the magnetic member and the said windings, and means movably mounting the said casing in a position to permit the magnetic elements to pass between the pole-pieces of the magnetic member, whereby the successive movement of the magnetic elements therepast effects an alternate increase and decrease in the density of the magnetic flux in the magnetic member, and in a manner to permit movement of the magnetic member in correspondence with the movement of the non-magnetic member to maintain a predetermined relation of the non-magnetic member and the magnetic member.

16. Apparatus for supplying a voltage effective in the control of a brake for a vehicle wheel, said brake being of the type having a friction element rotatable with the vehicle wheel, a non-rotative friction element and a brake cylinder device arranged to actuate said two friction elements into engagement to produce braking; said apparatus comprising in combination, a magnetic member supported by said brake cylinder, two windings disposed on said magnetic member, one of said windings being intended for connection to a source of direct-current supply whereby a magnetic flux will be produced in said magnetic member, and magnetic means carried by and rotatable with said vehicle wheel for coacting with said magnetic member to vary the flux therein while said wheel is rotating to thus cause a voltage to be induced in the other of said two windings.

17. Vehicle wheel brake control apparatus of the type wherein the brakes are applied and released under the control of the operator, comprising an induction-generator for supplying an alternating-current voltage having an effective value substantially proportional to the rotational speed of a wheel of the vehicle, a rectifier for converting the alternating-current voltage to direct-current voltage, a resistor on which the direct-current voltage is impressed, and means controlled in response to variations of the voltage impressed on said resistor for controlling the degree of application of the brakes associated with said wheel.

18. Control valve mechanism comprising a casing having a first communication, a second communication, a third communication, valve mechanism normally conditioned to connect said first and said second communication and operative to interrupt the connection between said first and said second communication and establish an exhaust connection from said second communication to atmosphere, three passages connecting said second and said third communications, a valve controlling communication through a first one of said passages, a pressure-responsive means effective to cause operation of said valve to closed position in response to operation of the said valve mechanism and to maintain said valve in its closed position as long as the differential of fluid pressure in said first communication over that in said third communication exceeds a certain value, means in a second of said passages for restricting the rate of flow of fluid under pressure between said second and said third communications to a rate relatively slow compared to that through the said first passage at a time when said valve is in open position, and a one-way valve in the third of said passages for preventing the flow of fluid under pressure from said second to said third communication and permitting reverse flow of fluid under pressure therepast at a rate relatively rapid compared to that through said second passage.

19. Control valve mechanism comprising a casing having a first communication, a second communication, a third communication, valve mechanism normally conditioned to connect said first and said second communication and operative to effect closing of the connection between the said first and said second communications and to establish an exhaust connection to atmosphere from said second communication, electroresponsive means for controlling operation of said valve mechanism, three passages connecting said second and said third communications, a valve controlling communication through a first one of said passages, pressure responsive means subject on one side to the pressure in the said first communication and effective to cause said valve to be operated to its closed position in response to reduction of the pressure in said second communication by operation of said valve mechanism and to restore said valve to its open position when the differential of the pressure in the first communication over that in said third communication becomes less than a certain value, means in a second of said passages for restricting the rate of flow of fluid under pressure between said second and said third communications to a rate relatively slow compared to the rate of flow through said first passage when said valve is in open position, and a one-way valve in the third of said passages for preventing the flow of fluid under pressure from said second to said third communication and permitting reverse flow of fluid under pressure therepast at a rate relatively rapid compared to the rate of flow through said second passage.

JOSEPH C. McCUNE.